(12) United States Patent
Tichy et al.

(10) Patent No.: US 12,358,351 B2
(45) Date of Patent: Jul. 15, 2025

(54) THREE DIMENSIONAL OVERMOLDING

(71) Applicants: Magna Exteriors Inc., Concord (CA); Stanislav Tichy, Troy, MI (US)

(72) Inventors: Stanislav Tichy, Troy, MI (US); Riad Chaaya, Clarkston, MI (US); Mark P. Birka, Northville, MI (US); Christopher J. Kuntze, Goodrich, MI (US); Heiner Salzmann, Metamora, MI (US)

(73) Assignee: Magna Exteriors Inc., Aurora (CA)

( * ) Notice: Subject to any disclaimer, the term of this patent is extended or adjusted under 35 U.S.C. 154(b) by 486 days.

(21) Appl. No.: 17/620,413

(22) PCT Filed: Jun. 19, 2020

(86) PCT No.: PCT/US2020/038783
§ 371 (c)(1),
(2) Date: Dec. 17, 2021

(87) PCT Pub. No.: WO2020/257678
PCT Pub. Date: Dec. 24, 2020

(65) Prior Publication Data
US 2022/0347900 A1    Nov. 3, 2022

Related U.S. Application Data

(60) Provisional application No. 62/864,785, filed on Jun. 21, 2019, provisional application No. 62/864,981, (Continued)

(51) Int. Cl.
| | |
|---|---|
| B60J 5/10 | (2006.01) |
| B29C 45/14 | (2006.01) |
| B29C 45/44 | (2006.01) |
| B29K 705/00 | (2006.01) |
| B29L 31/30 | (2006.01) |

(52) U.S. Cl.
CPC ......... *B60J 5/107* (2013.01); *B29C 45/14336* (2013.01); *B29C 45/14631* (2013.01);
(Continued)

(58) Field of Classification Search
None
See application file for complete search history.

(56) References Cited

U.S. PATENT DOCUMENTS

| | | |
|---|---|---|
| 2003/0152745 A1 | 8/2003 | Wagenblast |
| 2004/0105949 A1 | 6/2004 | Krause |

FOREIGN PATENT DOCUMENTS

| | | |
|---|---|---|
| CN | 1051009 A | 5/1991 |
| CN | 1427758 A | 7/2003 |

(Continued)

OTHER PUBLICATIONS

Machine translation FR2930476A1 (Year: 2009).*
(Continued)

*Primary Examiner* — Jacob T Minskey
*Assistant Examiner* — Wayne K. Swier
(74) *Attorney, Agent, or Firm* — Warn Partners, P.C.

(57) ABSTRACT

A three-dimensional overmolding and process for manufacturing same. The three-dimensional overmolding has a three-dimensional structure with overmolding, which gives significant performance benefits. Assembly and joining of reinforcements is done before the overmolding or in the injection molding tool. The three-dimensional overmolding meets predetermined structural requirements without requiring secondary operations and at a lower mass and cost. The structural benefits are due to the three dimensional shape in combination with the benefit of the overmolding process.

24 Claims, 5 Drawing Sheets

Related U.S. Application Data filed on Jun. 21, 2019, provisional application No. 62/864,685, filed on Jun. 21, 2019, provisional application No. 62/864,878, filed on Jun. 21, 2019, provisional application No. 62/864,691, filed on Jun. 21, 2019.

(52) U.S. Cl.
CPC .... *B29C 45/44* (2013.01); *B29C 2045/14327* (2013.01); *B29C 2045/445* (2013.01); *B29K 2705/00* (2013.01); *B29L 2031/3014* (2013.01); *E05Y 2201/636* (2013.01); *E05Y 2600/626* (2013.01); *E05Y 2900/546* (2013.01)

(56) References Cited

FOREIGN PATENT DOCUMENTS

| | | | | |
|---|---|---|---|---|
| CN | 105711030 | A | | 6/2016 |
| DE | 10022360 | A1 | | 11/2001 |
| EP | 0410553 | A2 | | 1/1991 |
| EP | 1724185 | A1 | | 11/2006 |
| FR | 2930476 | A1 * | 10/2009 | ............. B29C 70/78 |
| FR | 2935327 | A1 * | 3/2010 | ......... B60R 21/2165 |
| FR | 3065388 | A1 | | 10/2018 |
| WO | 2016030590 | A1 | | 3/2016 |
| WO | 2016030591 | A1 | | 3/2016 |
| WO | WO-2018065822 | A1 * | 4/2018 | ............. B60J 5/044 |
| WO | WO-2018108252 | A1 * | 6/2018 | ....... B29C 45/14065 |
| WO | 2018150376 | A1 | | 8/2018 |

OTHER PUBLICATIONS

Machine translation FR2935327A1 (Year: 2010).*
Machine translation CN105711030A (Year: 2016).*
International Search Report for PCT/US2020/038783 dated Oct. 8, 2020, 2-pages.
Search Report for Application No. CN202080058800.2 dated Sep. 25, 2023, 2-pages.
1 Search Report for Application No. CN202080058800 dated Dec. 17, 2024, 2 pages.

* cited by examiner

THREE DIMENSIONAL OVERMOLDING

CROSS-REFERENCE TO RELATED APPLICATIONS

This application is a National Stage of PCT International Application No. PCT/US2020/038783, filed Jun. 19, 2020 and claims the benefit of U.S. Provisional Patent Application No. 62/864,685, filed Jun. 21, 2019, U.S. Provisional Patent Application No. 62/864,691, filed Jun. 21, 2019, U.S. Provisional Patent Application No. 62/864,785, filed Jun. 21, 2019, U.S. Provisional Patent Application No. 62/864,878, filed Jun. 21, 2019 and U.S. Provisional Patent Application No. 62/864,981, filed Jun. 21, 2019. The disclosures of the above applications are incorporated herein by reference.

FIELD OF THE INVENTION

The present invention relates to three-dimensional overmolding of reinforcements such as brackets for large panels to meet structural performance requirements and method for overmolding same.

BACKGROUND OF THE INVENTION

Large panels, such as, but not limited to, liftgate panels for vehicles, generally require reinforcement in areas to meet structural performance and standards such as load force standards. A conventional reinforcement is a metal bracket. Standard flat metal bracket overmolding does not fulfill the customer requirements regarding structural performance. Further, flat metal to flat metal bracket (flat-to-flat) has creep and lower stiffness. Stamping steel or other metal is also prone to waste of material, e.g., such as for flat-to-flat before process, and is heavier, and requires thicker pieces of metal. Known hollow tubes for stiffening, e.g., metal tube, collapse during processing.

Steel, aluminum, and magnesium castings fulfill the same performance requirements, but are much more expensive, higher weight, and have to be installed with secondary operations. Conventional liftgate panels, for example, are large and steel, aluminum and magnesium castings are expensive, higher weight, and must be installed with secondary operations.

Accordingly, there is a need for a three-dimensional structure with overmolding that gives significant performance benefits and method for manufacturing same that does not require secondary operations, that has lower mass and costs less.

SUMMARY OF THE INVENTION

Provide structural benefits to large panels due to three-dimensional (3D) shape of reinforcements in combination with the benefit of the overmolding process. Assembly and joining is either before the overmolding or in the injection tool. The present invention meets predetermined requirements without the need for secondary operations and does so at lower mass and cost.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
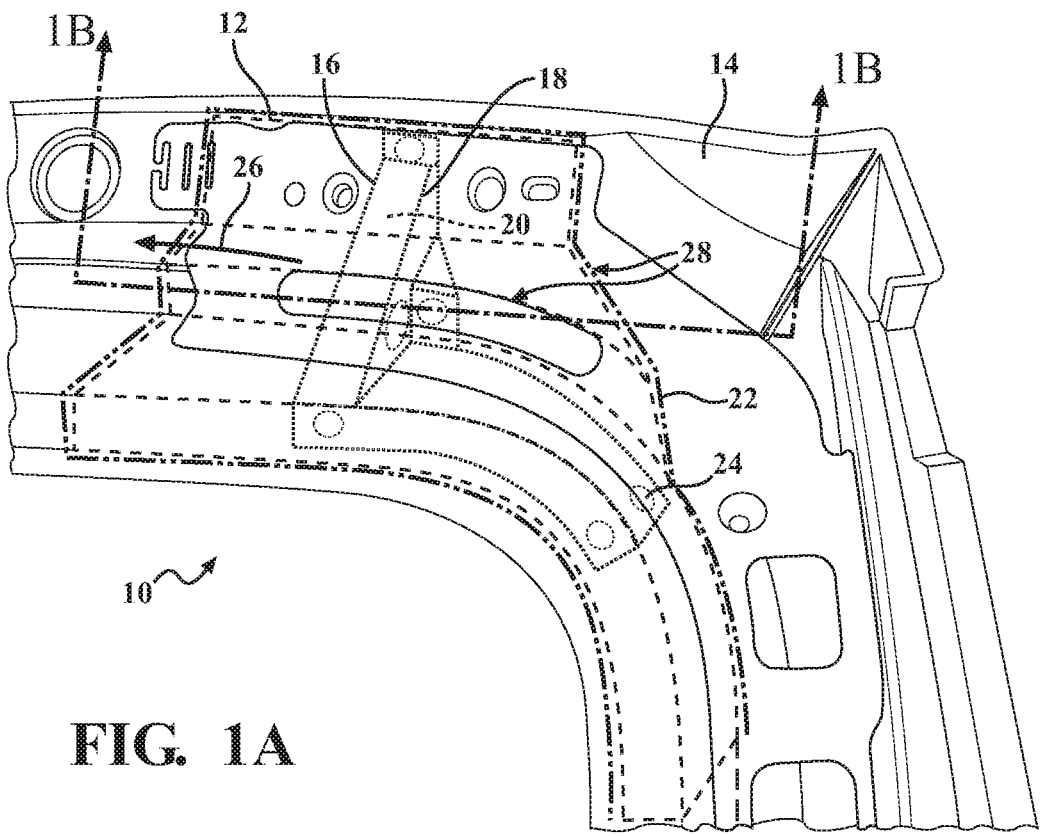
FIG. 1A is a rear elevation view of a hinge area of a liftgate panel depicting a 3D reinforcement, in accordance with the present invention.

The following description of the preferred embodiment(s) is merely exemplary in nature and is in no way intended to limit the invention, its application, or uses.

Referring to FIGS. 1A-5 generally, there is provided a three-dimensional (3D) reinforcement shape in combination with the benefit of an overmolding process at least partially overmold said reinforcment. Assembly and joining of the 3D reinforcement are either before the overmolding or in the injection tool. The present invention meets predetermined requirements without need of secondary operations and at lower mass and cost. A predetermined geometry is provided by the reinforcement that can be overmolded. Preferably, a 3D dimensioned reinforcement that is operably connected to another reinforcement. More preferably, a first reinforcement is operably connected to a panel and a second reinforcement is operably connected to the first reinforcement. Most preferably a first metal reinforcement is operably connected to a large panel, e.g., inner panel of a liftgate in a hinge area or any other predetermined area of the panel, and a second metal reinforcement is operably connected to the first reinforcement creating a 3D geometry. The reinforcement is overmolded.

Depending on the predetermined 3D geometry, in-tool action (e.g., incorporating a lifter), a temporary (e.g., removable) reinforcement, or no reinforcement (no lifter, no temporary reinforcement, etc) is used for overmolding. The 3D reinforcement is pre-assembled by a predetermined step (e.g., spot welded) or assembled in the tool (which in-tool assembly could eliminate spot weld steps).

According to an aspect of the present invention, a metal bracket reinforcement is fully overmolded on one or both sides of the panel. According to another aspect of the present invention, a metal bracket reinforcement is at least partially covered on one or both sides of the panel. According to another aspect of the present invention, a metal bracket reinforcement is only partially visible from the B-side of the panel (e.g., open at rib nuts, or more open to leave room for functional openings, etc). According to another aspect of the present invention, a metal bracket reinforcement is only partially visible from the B-side of the panel (e.g., open at rib nuts, or more open to leave room for functional openings, etc) so that it is not fully overmolded or covered on that one side, and is fully open or substantially open on the other side of the panel. Preferably, when overmolded to be fully covered, it is a show quality surface or Class-A surface with no read through issues.

According to an aspect of the present invention plastic flows between a first reinforcement and second reinforcement (e.g., 3D stamping reinforcement, 3D reinforcement channel, etc) in predetermined locations, e.g., such as between a raised rib that has a channel). At least one aperture, e.g., bleeder hole, is provided, e.g., through backside of the second reinforcement, for delivery of plastic to predetermined locations. According to an aspect of the present invention, the plastic is on top of the 3D structure (e.g., on top of the 3D structure in addition to within the raised rib channel within the 3D structure). Any of the aforementioned aspects are contemplated in combination depending on the application without departure from the scope of the present invention.

The 3D geometry of the present invention has significant advantages over flat plats. One advantage is that the interlocking 3D geometry prevents parts from sliding over each other to break the welds.

The reinforcements are preferably steel.

Figure 1B:
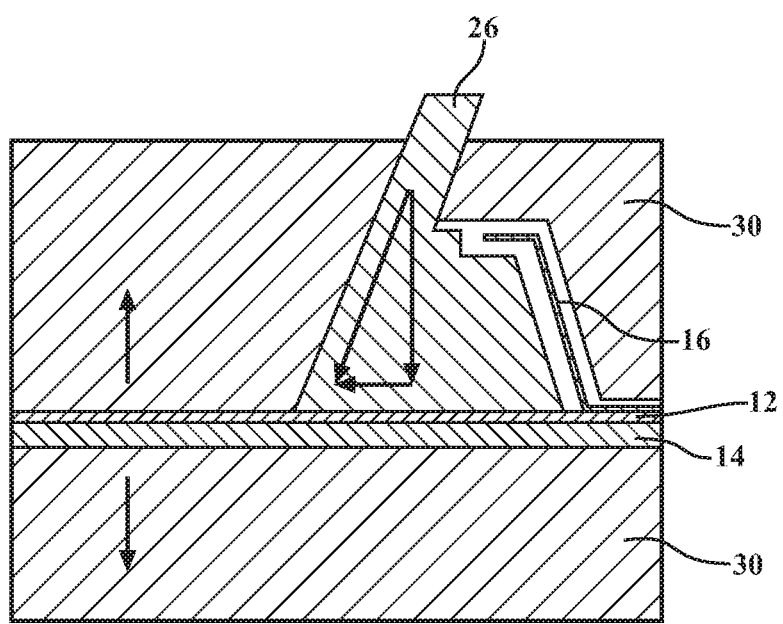
FIG. 1B is a cross sectional schematic of in-tool lifter action for overmolding, in accordance with the present invention.

Referring now more particularly to FIGS. 1A-1B, a 3D overmolding is shown generally at 10. A first reinforcement 12 is operably coupled to a panel 14 and a second reinforcement 16 is operably connected to the first reinforcement 12 (second 14 on top of the first 12). The second reinforcement 14 forms a predetermined 3D geometry. By way of non-limiting example, FIG. 1A depicts at least one raised rib 18 portion with an inner channel 20 (metal rib 18). Further depicted is exemplary seal edges 22 and a plurality of optional spot welds 24. The first and second reinforcements 12,16 are metal. The first and second reinforcements 12,16 are pre-assembled together (e.g., spot welded, welded, adhered, mechanical fit, etc and combinations thereof) or are assembled in the tool (e.g., eliminates spot welds). According to an aspect of the present invention, at least one lifter 26 is used with the tool 30 to prevent collapse of the 3D reinforcement structure, indicated generally at 28. The lifter 26 is preferably an injector pin that strokes in/out (moving along a vector). The arrow in FIG. 1A indicates exemplary tool action. The lifter 26 generally supports the sheet material. The present invention provides 3D geometry that can be overmolded combined with the tool action that prevents collapse, e.g., because the 3D geometry is generally supported for material overmold shots, then the lifter slides out. There is provided the structural benefits due to the 3D shape in combination with the benefit of the overmolding process. The 3D structure with overmolding of the present invention gives significant performance benefits. In addition, according to an aspect of the present invention, the invention also reduces the old need for spot welds because the reinforcements can be assembled in the tool. The 3D geometry of the second reinforcement 16 is a significant advantage over conventional systems (e.g., including flat brackets), including, but not limited to, the 3D geometry improves stiffness and helps with creep. It is understood that the 3D geometry is any predetermined geometry depending on the application without departure from the scope of the present invention.

Figure 2A:
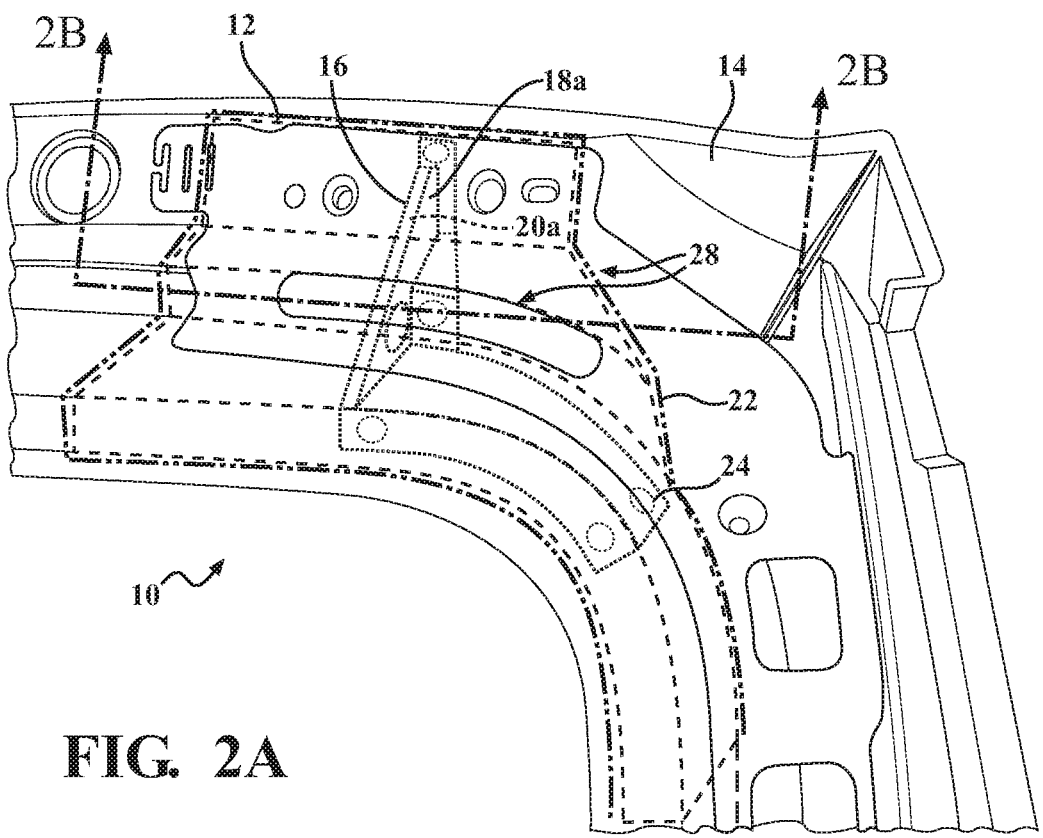
FIG. 2A is a rear elevation view of a liftgate panel depicting 3D reinforcement with a smaller dimensional area, in accordance with the present invention.
Figure 2B:
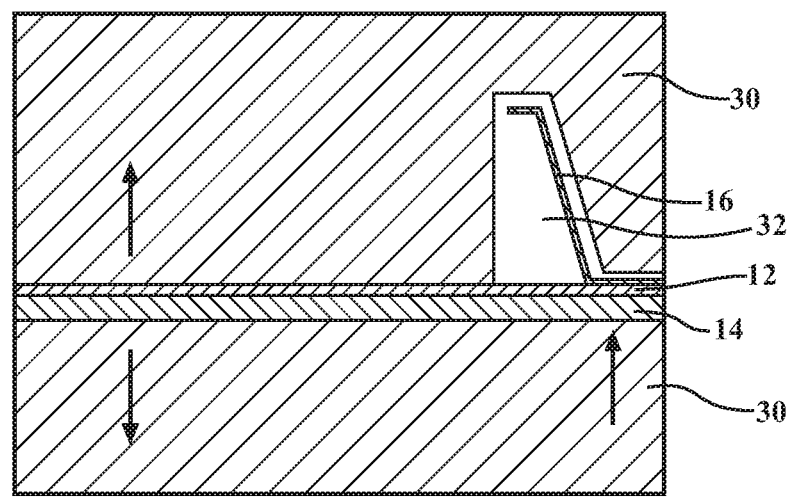
FIG. 2B is a cross-sectional schematic of a no in-tool lifter action for overmolding, in accordance with the present invention.

Referring now more particularly to FIGS. 2A-2B, a 3D overmolding is shown generally at 10. A first reinforcement 12 is operably coupled to a panel 14 and a second reinforcement 16 is operably connected to the first reinforcement 12 (second 14 on top of the first 12). The second reinforcement 14 forms a predetermined 3D geometry. By way of non-limiting example, FIG. 2A depicts at least one raised rib 18a portion with an inner channel 20a (metal rib 18a). However, this raised rib 18a and channel 20a is a predetermined size/smaller and no lifter is needed to prevent collapse. It is understood that the 3D geometry/size/dimensions/etc is any predetermined geometry depending on the application without departure from the scope of the present invention. Further depicted is exemplary seal edges 22 and a plurality of optional spot welds 24. The first and second reinforcements 12,16 are metal. The first and second reinforcements 12,16 are pre-assembled together (e.g., spot welded, welded, adhered, mechanical fit, etc and combinations thereof) or are assembled together in the tool 30 (e.g., eliminates spot welds). There is first no plastic within the cavity 32 on the B-side (non-show quality surface of the panel 14). By way of non-limiting example, this small, unsupported area, cavity 32, is sealed-off metal, e.g., steel, so that no plastic enters. Even though it is unsupported, this small area does not suffer from sink mark issues. The present invention provides 3D geometry that can be overmolded. The 3D geometry of the second reinforcement 16 is a significant advantage over conventional systems (e.g., including flat brackets), including, but not limited to, the 3D geometry improves stiffness and helps with creep. There is provided the structural benefits due to the 3D shape in combination with the benefit of the overmolding process. The 3D structure with overmolding of the present invention gives significant performance benefits. In addition, according to an aspect of the present invention, the invention also reduces the old need for spot welds because the reinforcements can be assembled in the tool. It is understood that the 3D geometry/size/dimensions/etc is any predetermined geometry depending on the application without departure from the scope of the present invention. According to an aspect of the present invention, the invention also reduces the old need for spot welds because the reinforcements can be assembled in the tool.

Figure 3A:
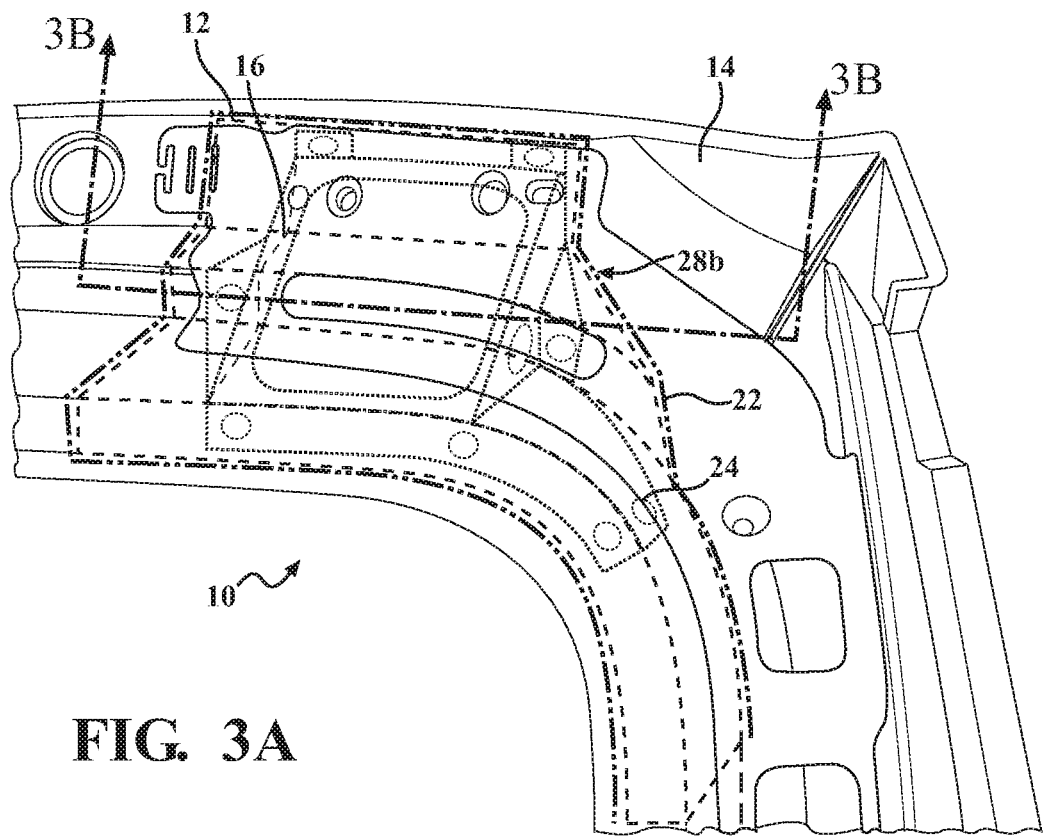
FIG. 3A is a rear elevation view of a liftgate panel depicting a 3D reinforcement with a more complex 3D geometry, in accordance with the present invention.
Figure 3B:
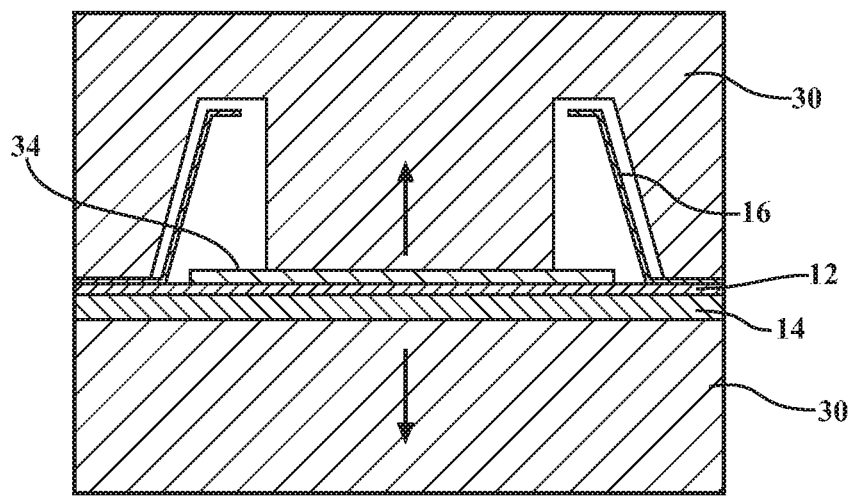
FIG. 3B is a cross-sectional schematic of a temporary reinforcement for overmolding, in accordance with the present invention.
Figure 4A:
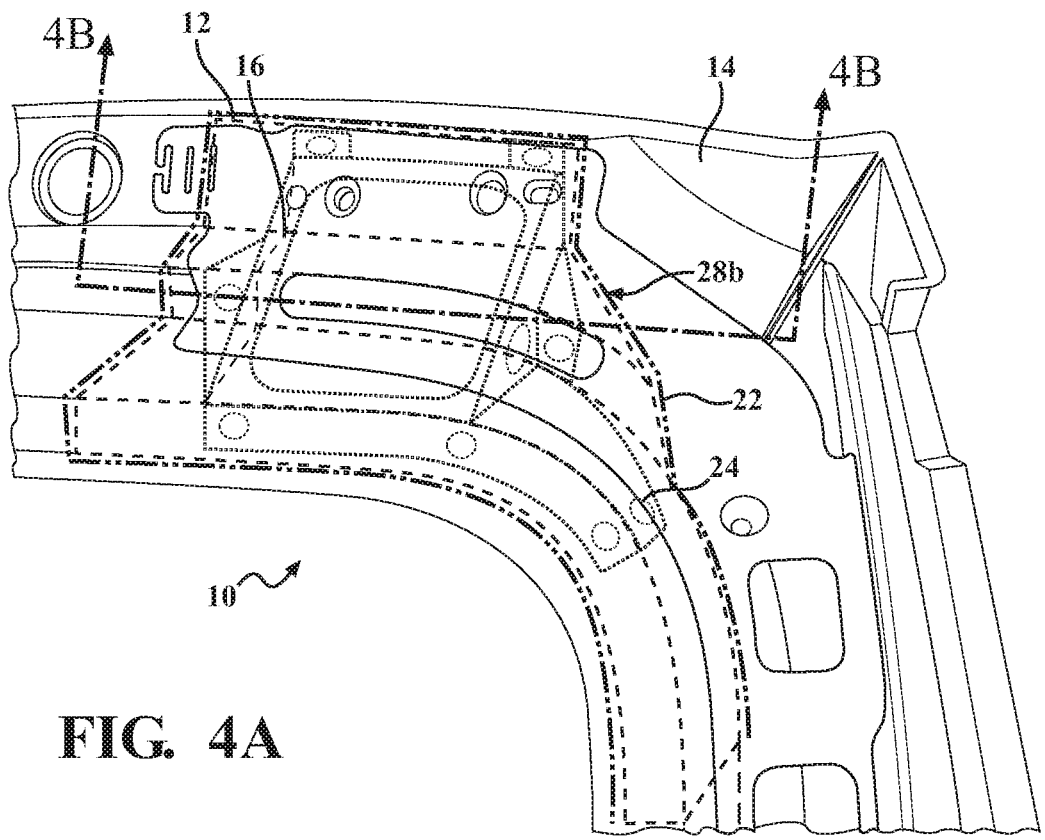
FIG. 4A is a rear elevation view of a liftgate panel depicting a 3D reinforcement with a more complex but smaller 3D geometry, in accordance with the present invention.
Figure 4B:
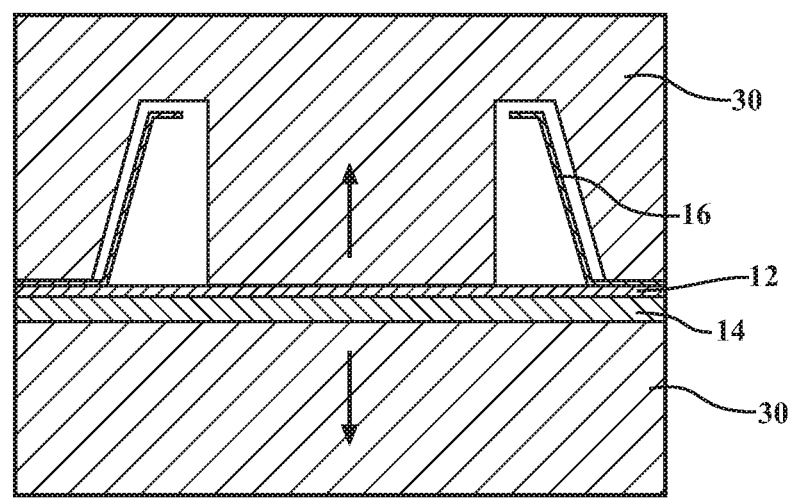
FIG. 4B is a cross-sectional schematic and no in-tool lifter or temporary reinforcement for overmolding, in accordance with the present invention.

Referring now more particularly to FIGS. 3A-3B, a 3D overmolding is shown generally at 10. A first reinforcement 12 is operably coupled to a panel 14 and a second reinforcement 16 is operably connected to the first reinforcement 12 (second 14 on top of the first 12). The second reinforcement 14 forms a predetermined 3D geometry. By way of non-limiting example, FIG. 3A depicts a 3D reinforcement structure 28b with an exemplary more complex 3D geometry. However, this 3D reinforcement structure 28b requires no lifter to prevent collapse. A predetermined temporary reinforcement 34 is used instead. The temporary reinforcement 34 is preferably a plate, most preferably a steel plate. The temporary reinforcement 34 transfers pressure. Further depicted is exemplary seal edges 22 and a plurality of optional spot welds 24. The first and second reinforcements 12,16 are metal. The first and second reinforcements 12,16 are pre-assembled together (e.g., spot welded, welded, adhered, mechanical fit, etc and combinations thereof) or are assembled in the tool (e.g., eliminates spot welds). There is provided the structural benefits due to the 3D shape in combination with the benefit of the overmolding process. The 3D structure with overmolding of the present invention gives significant performance benefits. In addition, according to an aspect of the present invention, the invention also reduces the old need for spot welds because the reinforcements can be assembled in the tool. It is understood that the 3D geometry/size/dimensions/etc is any predetermined geometry depending on the application without departure from the scope of the present invention. According to an aspect of the present invention, the invention also reduces the old need for spot welds because the reinforcements can be assembled in the tool. The temporary reinforcement 34 can be automated, in accordance with an aspect of the present invention. Alternatively, at least one small unsupported area(s) is configured such that no lifter or temporary reinforcement is required (see FIGS. 4A-4B).

Figure 5:
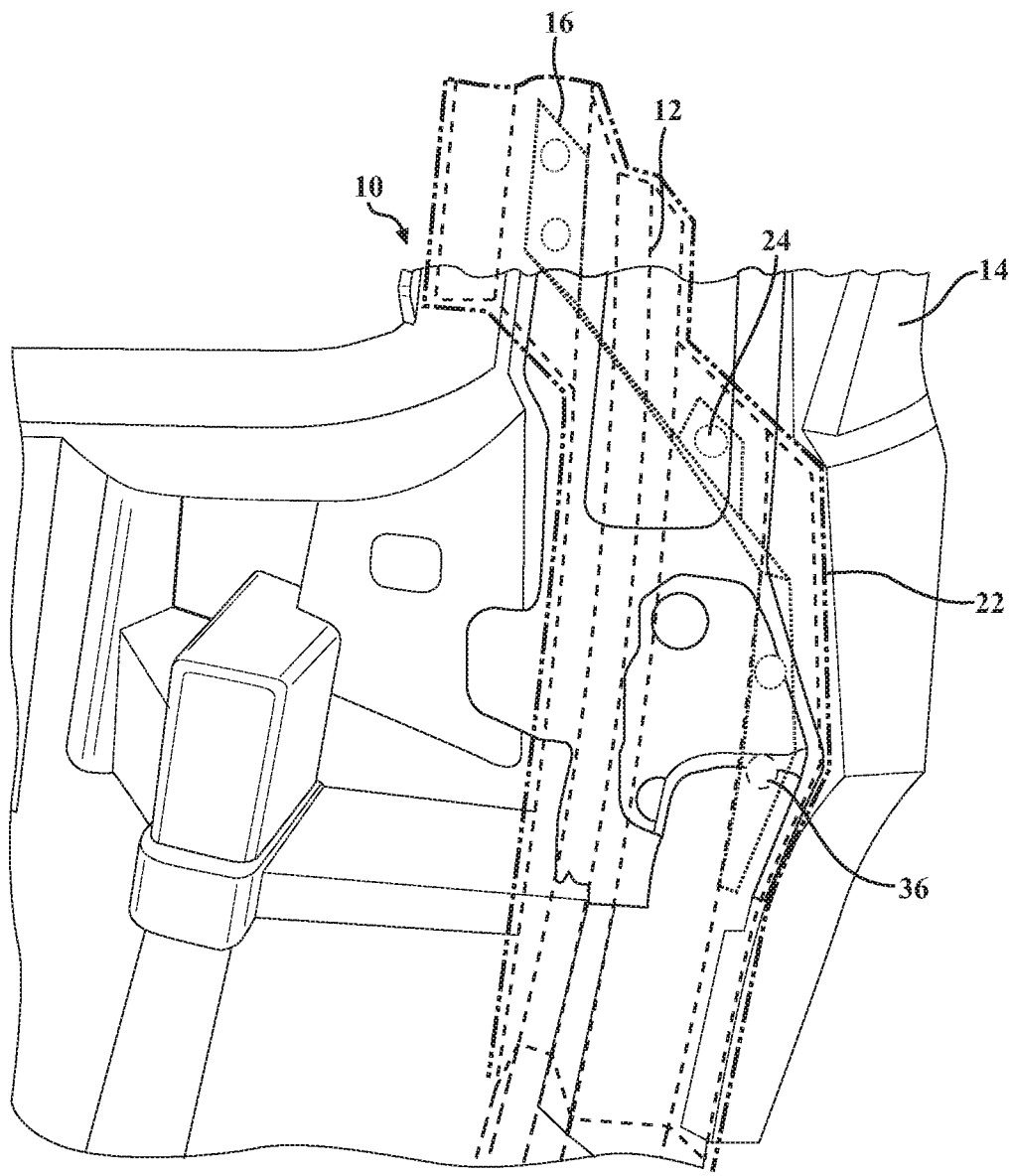
FIG. 5 is a rear elevation view of a ball joint area of a liftgate panel depicting a 3D reinforcement including a profile that fights against collapse during overmolding, in accordance with the present invention.

Referring now more particularly to FIG. 5, a 3D overmolding is shown generally at 10. A first reinforcement 12 is operably coupled to a panel 14, e.g., inner panel of a liftgate, and a second reinforcement 16 is operably connected to the first reinforcement 12 (second 14 on top of the first 12). The second reinforcement 14 forms a predetermined 3D geometry. By way of non-limiting example, FIG. 5 depicts generally U-shaped profile and the steel reinforcement fights against the collapse during processing in the tool. Any other suitable profile is contemplated without departure from the scope of the present invention. Further depicted is exemplary seal edges 22 and a plurality of optional spot welds 24. The first and second reinforcements 12,16 are metal. The first and second reinforcements 12,16 are pre-assembled together (e.g., spot welded, welded, adhered, mechanical fit, etc and combinations thereof) or are assembled in the tool (e.g., eliminates spot welds). There is provided the structural benefits due to the 3D shape in combination with the benefit of the overmolding process. The 3D structure with overmolding of the present invention gives significant performance benefits. In addition, according to an aspect of the present invention, the invention also reduces the old need for spot welds because the reinforcements can be assembled in the tool. It is understood that the 3D geometry/size/dimensions/etc is any predetermined geometry depending on the application without departure from the scope of the present invention. According to an aspect of the present invention, the invention also reduces the old need for spot welds because the reinforcements can be assembled in the tool. The location of the 3D overmolding 10 is at a ball stud 36 area of the panel 14.

Referring to FIGS. 1A-5 generally, while an inner panel of a liftgate is shown, it is understood that the present invention is applicable to and adaptable to any vehicle panel, especially large panels, such as, but not limited to, door panels, door deck lids, enclosure panels, liftgates, tailgates, windshield panels, window panels, etc and any other panel without departure from the scope of the present invention.

While a hinge reinforcement area is shown, it is understood that the present invention is applicable to and adaptable to any area of a large panel, such as, but not limited to, upper hinge area, strut area, ball joint area, windshield area, window area, license plate area, garnish trim, side trim, ribbing, etc. and any other area or on any other panel and area without departure from the scope of the present invention.

While the first and second reinforcements 12,16 are metal, it is understood that alternative materials suitable for meeting predetermined requirements depending on the application are contemplated without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A three-dimensional overmolding, comprising:
at least one three-dimensional (3D) reinforcement operably connected to at least one reinforcement forming a predetermined 3D geometry, said at least one 3D reinforcement including at least one rib; and
at least a partial overmold of said 3D geometry;
wherein said at least one reinforcement is operably coupled to a liftgate panel surface, and
wherein each overmolded 3D geometry is located at a respective upper corner of said liftgate panel surface.

2. The three-dimensional overmolding of claim 1, wherein the 3D geometry is adapted for being in contact with a tool action operably supporting the 3D geometry structure for material overmold shots.

3. The three-dimensional overmolding of claim 1, wherein the 3D geometry is adapted for being in contact with a lifter injector pin that strokes in for structural support of the 3D overmolding.

4. The three-dimensional overmolding of claim 1, wherein the 3D geometry is adapted for being in contact with a temporary reinforcement for support of the 3D overmolding against collapse.

5. The three-dimensional overmolding of claim 1, wherein said at least one rib comprises a metal rib with channel sized to overmold without an in-tool lifter or temporary reinforcement.

6. The three-dimensional overmolding of claim 1, wherein the reinforcements at least one 3D reinforcement and at least one reinforcement are adapted to be pre-assembled before overmolding.

7. The three-dimensional overmolding of claim 1, wherein the reinforcements are adapted to be assembled in an injection molding tool.

8. The three-dimensional overmolding of claim 1, wherein the 3D reinforcement is a 3D stamped steel reinforcement.

9. The three-dimensional overmolding of claim 1, wherein the reinforcements at least one 3D reinforcement and at least one reinforcement are not flat metal brackets.

10. The three-dimensional overmolding of claim 1, comprising at least one additional reinforcement, wherein the plurality of reinforcements is at least one 3D reinforcement, at least one reinforcement and at least one additional reinforcement are at least partially overmolded.

11. The three-dimensional overmolding of claim 1, wherein there are no spot welds.

12. The three-dimensional overmolding of claim 1, wherein the three-dimensional overmolding meets predetermined structural requirements with the 3D geometry combined with overmolding.

13. The three-dimensional overmolding of claim 1, wherein the three-dimensional overmolding is operably connected to the liftgate panel.

14. The three-dimensional overmolding of claim 1, comprising a plurality of three-dimensional overmoldings, wherein each three-dimensional overmolding is operably connected at both upper corners of a plastic liftgate panel.

15. A three-dimensional overmolding operably adapted for a vehicle, comprising:
- at least one first reinforcement that is metal and including 3D geometry;
- at least one second reinforcement that is metal, said first and second reinforcement operably joined forming a predetermined 3D geometry interface; and
- an overmold of at least the 3D geometry interface to meet predetermined structural requirements;
- wherein said first or second reinforcement is operably coupled to a liftgate panel surface, and
- wherein each overmolded 3D geometry interface is located at a respective upper corner of the liftgate panel surface.

16. A method of making a three-dimensional overmolding, comprising:
- providing at least one 3D reinforcement operably connected to at least one reinforcement forming a predetermined 3D geometry, said at least one 3D reinforcement including at least one rib;
- providing an injection molding tool; and
- injecting a predetermined plastic material in a tool forming at least a partial overmold on at least one said of said 3D reinforcement;
- wherein said at least one reinforcement is operably coupled to a liftgate panel surface, and
- wherein each overmolded 3D geometry is located at a respective upper corner of the liftgate panel surface.

17. The method of claim 16, further comprising preassembly the reinforcements before overmolding.

18. The method of claim 16, wherein the reinforcements are assembled in the injection molding tool.

19. The method of claim 16, further comprising spot welding the reinforcements at predetermined locations.

20. The method of claim 16, wherein none of the reinforcements are spot welded.

21. The method of claim 16, further comprising providing tool action supporting the 3D structure.

22. The method of claim 16, further comprising providing a lifter injector pin that strokes in for structural support of 3D overmolding.

23. The method of claim 16, further comprising providing a temporary reinforcement for support of 3D overmolding against collapse.

24. The method of claim 16, further comprising providing a metal rib with channel sized to overmold without a lifter or temporary reinforcement.

* * * * *